United States Patent [19]

Monahan

[11] 4,037,254
[45] July 19, 1977

[54] AUTOMATIC DIGITAL IRIS CORRECTION

[75] Inventor: John F. Monahan, Quincy, Ill.

[73] Assignee: Harris Corporation, Cleveland, Ohio

[21] Appl. No.: 639,470

[22] Filed: Dec. 10, 1975

[51] Int. Cl.² .......................................... H04N 5/193
[52] U.S. Cl. ................................................. 358/228
[58] Field of Search ..................... 178/DIG. 29, 7.2; 354/43, 44; 250/229; 350/17; 352/141; 325/392; 358/228, 227

[56] References Cited

U.S. PATENT DOCUMENTS

| | | | |
|---|---|---|---|
| 3,287,496 | 11/1966 | Webb | 178/7.2 |
| 3,571,495 | 3/1971 | Konings | 178/7.2 |
| 3,767,853 | 10/1973 | Bendell et al. | 178/7.2 |
| 3,784,740 | 1/1974 | Copland | 178/DIG. 29 |
| 3,823,263 | 7/1974 | Guppy | 178/7.2 |
| 3,903,472 | 9/1975 | Wahl | 325/392 |
| 3,969,735 | 9/1976 | Nobusawa | 354/43 |

Primary Examiner—John C. Martin

[57] ABSTRACT

An automatic iris control for a television camera has a peak detector for producing a peak signal, representative of the illumination level on the imaging tubes, from the video signal. At least one range comparator is included to compare the peak signal with an acceptable signal range. Two command signals, indicating high out of range and low out of range conditions, are produced thereby. A digital counter responds to out of range conditions by counting upwards or downwards in dependence upon the command signals. A digital to analog converter decodes the digital output of the counter into a corresponding analog signal. A D.C. controlled iris servo opens the iris an amount proportionate to the analog signal. The light admitted through the iris is thereby contained within acceptable limits.

6 Claims, 5 Drawing Figures

AUTOMATIC DIGITAL IRIS CORRECTION

The present invention relates to the art of input light control of television cameras and more particularly to the art of automatic variable speed iris controls for television cameras.

In the use of television cameras, the televised scene may vary widely in average level of illumination. Because the imaging tube used for such television cameras commonly cannot respond to such wide variations, a variable light control must be provided to regulate the amount of light reaching the tube from such scenes. In the art this has been accomplished in a variety of ways; for example, an iris or a variable transmittance lens can be interposed between the light source and the imaging tube. Manual control of such devices suffers from a variety of problems; among them, nonuniform and inaccurate control, as well as relatively slow response to changing scene illumination.

To overcome these problems automatic means have been devised for the control of such light intensity control devices. These automatic controls function to monitor the video output of the imaging tubes. If the signal intensity varies too widely from a fixed nominal value, the control circuit responds by adjusting the amount of light admitted to the imaging tube to bring the video signal amplitude back within the acceptable range. If the automatic control has a fixed response speed, problems may be encountered. If the response is too fast the circuit may overshoot the desired iris opening, while a slow response speed may be inadequate to respond to rapid changes in scene illumination. Consequently, if a single response speed is chosen, it must generally represent a compromise between these extremes.

This problem can be resolved through use of a double loop control system. For small changes in scene illumination a control loop with a slow response speed is chosen to prevent overshoot. When a large change in scene illumination occurs, however, a second control loop with a more rapid response is introduced. To prevent overshoot, the second loop is designed to drop out when the illumination is brought within a given range of the nominal level. The slow control loop then completes the error correction.

Television cameras often include a lens cap feature wherein the lens is covered when the television camera is not in immediate use. This would induce the automatic system to cycle the iris wide open were not some protective means introduced. Consequently, a feature must be included whereby the automatic iris control is disabled when the lens cap is utilized.

In the prior art, analog control circuits have been devised to provide the automatic control of the light level. Because these analog circuits suffer from drift and noise problems, a digital solution is desirable.

It is therefore an object of the present invention to provide digital apparatus for the automatic control of the light input to a television camera.

It is a further object of the present invention to provide a digital double loop control system which allows quick response without substantial overshoot.

In accordance with the present invention, apparatus is provided for automatically controlling the input light to a television camera to maintain the amplitude of the video output thereof between fixed upper and lower limits. The video output is peak detected to provide a signal whose amplitude varies correspondingly with variations of the peak amplitude of the video output. The output of the peak detector is compared with the fixed upper and lower limits by a range comparator. First and second command signals produced by the range comparator indicate when the output of the peak detector has respectively risen above or fallen below the fixed levels. A digital counter responds in accordance with the command signals by counting upwards or downwards respectively. The output of the counter is connected to a digital to analog converter which converts the digital output into a corresponding analog signal. The control loop is closed by directing the analog signal into a D.C. controlled iris servo mechanism which opens the iris of the camera an amount proportionate with the analog signal.

DESCRIPTION OF THE PREFERRED EMBODIMENT

The foregoing and other objects and advantages of the invention will become more readily apparent from the following description of the preferred embodiment of the invention as taken in conjunction with the accompanying drawings which are a part hereof and wherein.

Figure 1:
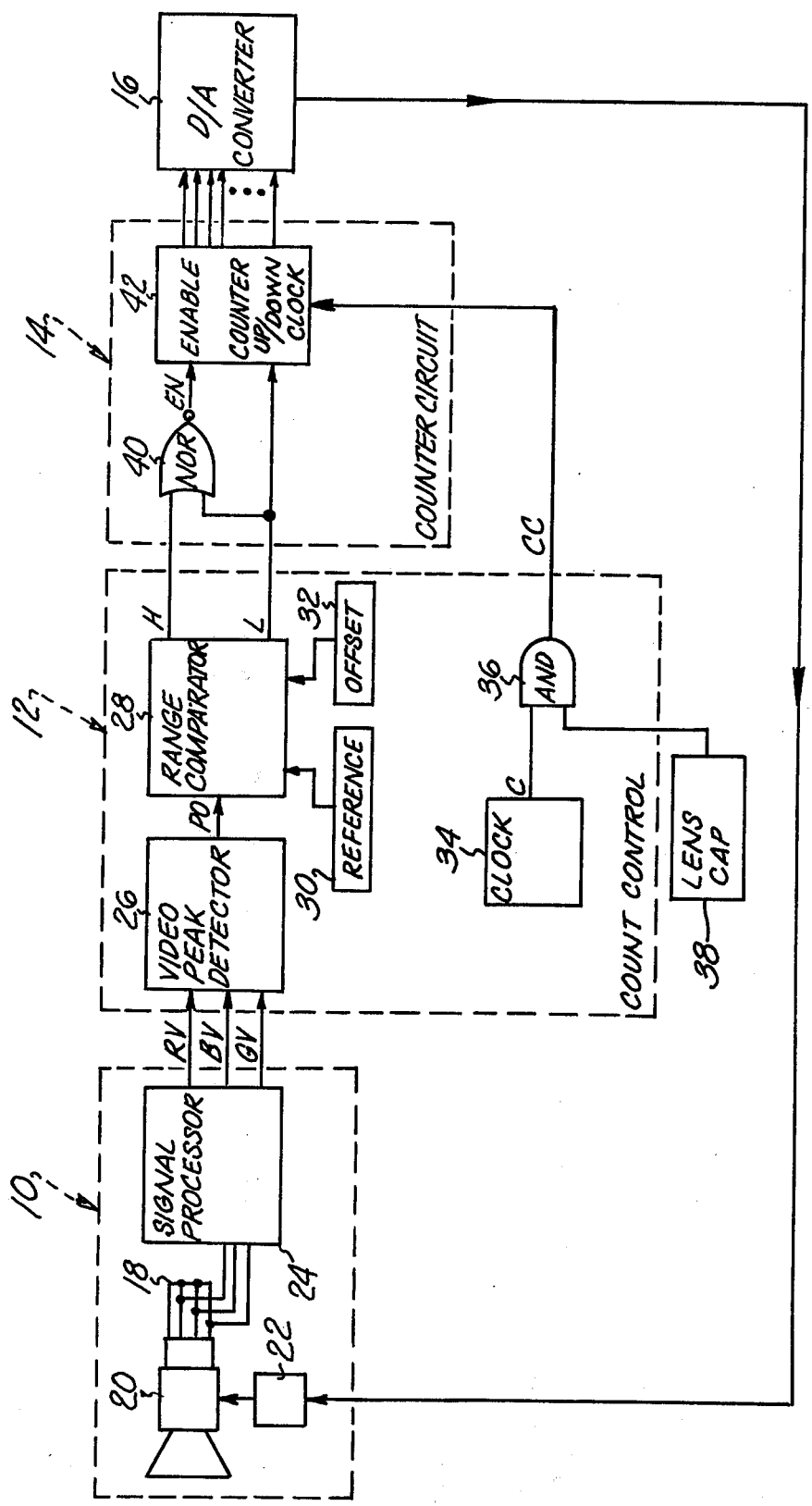
FIG. 1 is a block diagram of a single loop embodiment of the present invention.

Referring now specifically to FIG. 1 a video signal source 10 provides video signals RV, BV, and GV. These signals are monitored by the light intensity control circuit, comprised generally of count control circuitry 12, counter circuit 14, and digital analog converter 16. Light is admitted to the imaging tubes 18 through iris 20, controlled by D.C. controlled servo 22. The signal outputs of imaging tubes 18 are processed by signal processor 24 which provides video output signals RV, BV, and GV.

These signals are peak detected by video peak detector 26 which provides an output signal PO which varies in accordance with the peak value of the video signals. Range comparator 28 compares the peak output signal PO produced by video peak detector 26 with an acceptable signal range having upper and lower limits defined by reference signal 30 plus or minus offset signal 32. Range comparator 28 has two command outputs, H and L. As long as the peak signal is within the acceptable signal range, command outputs H and L remain at digital 0. If the peak signal rises above the upper limit of the range, output H changes from a digital 0 to a digital 1. If the peak signal falls below the lower limit of the range, output L changes from a digital 0 to a digital 1. Clock circuitry 34 provides a periodic pulse train on clock output C. The application of clock output C to counter circuit 14 is controlled by "AND" gate 36 in response to lens cap switch 38. Counter clock CC is thus provided by gate 36 only when the lens is uncapped.

In digital up/down counter circuit 14, digital "NOR" gate 40 adds command signals H and L to provide a count enable output EN. Count enable output EN is normally at digital 1 and switches to 0 whenever the peak signal moves out of the acceptable range. When output EN is at 0 digital up-down counter 42 responds to counter clock CC by counting either up or down. The direction of the count is controlled by the state of command signal L. Thus when command signal L is low, i.e. at a digital 0, counter 42 will count down from the number represented at its digital output. When command signal L is high, i.e. at a digital 1, counter 42 will count up from the number represented at its digital output. In each case the succeeding steps in the count will appear at the digital output of counter 42. When output EN returns to a digital 1, the output of counter 42 will remain at its latest value. The digital output of up/down counter 42 is decoded into an analog signal by digital to analog converter 16. The analog signal controls DC control iris servo 22 which opens the iris 20 in direct relation to the amplitude thereof.

In operation, when the intensity of light reaching imaging tubes 18 rises above the desired range, the video outputs of signal processor 24 will rise accordingly. The peak signal output PO of video peak detector 26 will thus climb above the range set by reference 30 and offset 32. Command signal H will go to a digital 1 which will enable counter 42. Since command signal L is low, the digital counter will count in a downward direction, thereby subtracting each clock pulse from the number represented by its digital output. The output of the digital to analog converter will decline accordingly. As the analog signal diminishes, the iris control servo 22 will respond by closing the iris opening. This, in turn, will limit the intensity of light reaching imaging tubes 18. The amplitude of the video output signals will then shrink, thus bringing peak signal PO back within the acceptable range. Finally, the enable signal EN will go high, returning the system to its stable state.

In a similar manner, the circuitry will compensate for low light levels by enabling the digital counter to count in an upward direction, thus opening the iris. In this manner the intensity of light admitted to imaging tubes 18 is retained within a certain range of a fixed nominal intensity.

Figure 2:
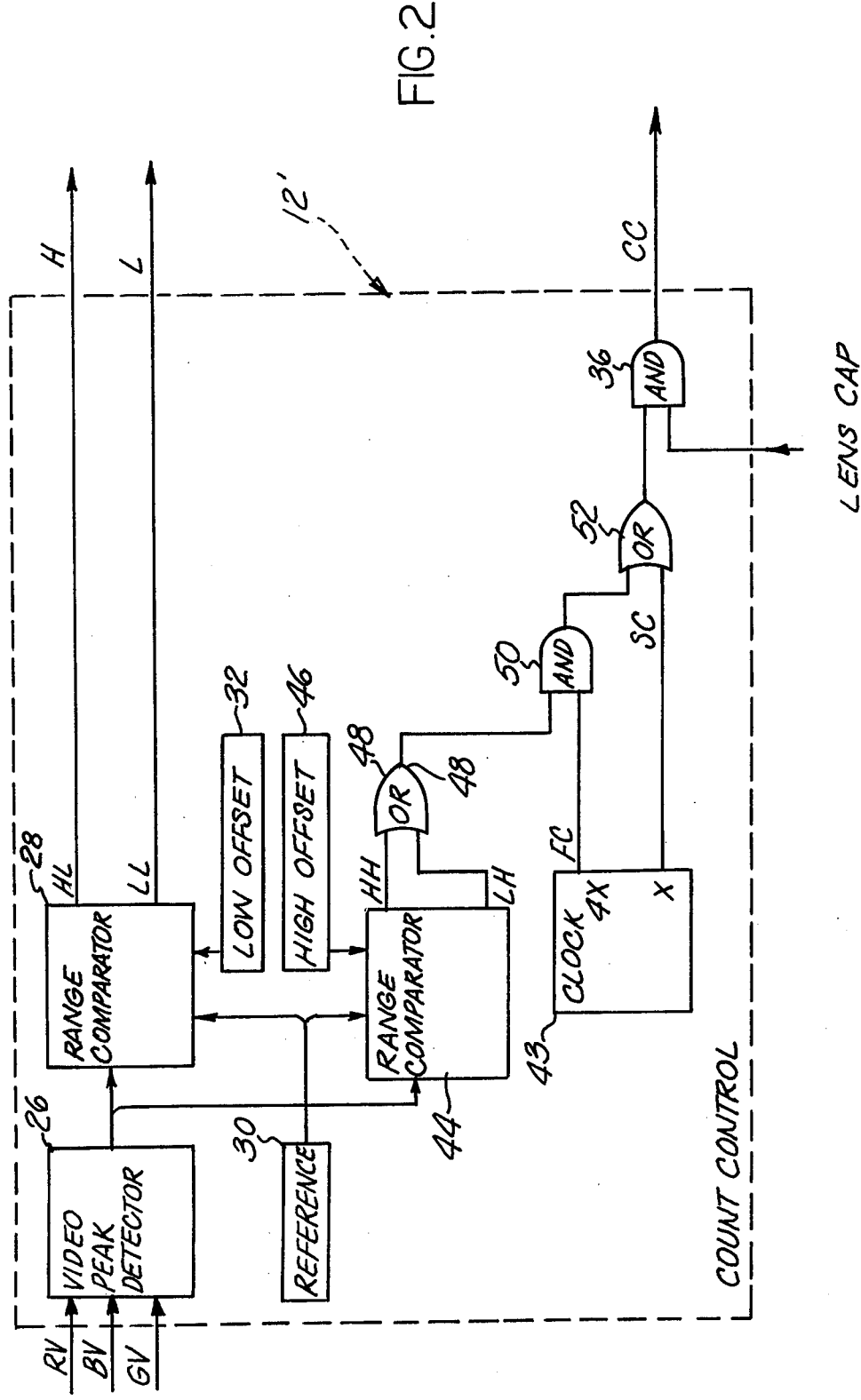
FIG. 2 is a block diagram of the count control portion of a double loop embodiment of the invention.

FIG. 2 is a block diagram of the count control circuitry 12' of a two loop embodiment of the invention. All other, unpictured elements of this embodiment are identical to those of the first embodiment as shown in FIG. 1. Also, corresponding parts of count control circuitry 12 and 12' in FIGS. 1 and 2 are numbered identically. This embodiment includes a second clock signal, higher in frequency than the first, and a second range comparator for controlling the application of the second clock signal to the counter.

In the embodiment shown, clock circuit 43 generates both the fast and slow clock signals. By way of example, fast clock FC is shown to be four times greater in frequency than slow clock SC.

Range comparator 44 has upper and lower limits defined by reference 30 plus or minus high offset 46. Since high offset 46 is greater than low offset 32, comparator 44 presents a correspondingly broader acceptable signal range to the peak signal, thus responding to only large excursions thereof. Comparator 44 has outputs HH and LH which respectively respond to high out of range and low out of range conditions. Outputs HH and LH are conjunctively joined by digital "OR" gate 48 to produce a third command signal at its output. The third command signal acts to selectively enable the fast clock output FC of clock 34 through digital AND gate 50 whenever large excursions occur. The output of AND gate 50 is coupled into the clock line C along with the slow clock SC by digital OR gate 36.

Whenever the video output shifts amplitude so abruptly that the peak signal PO varies from the reference signal by more than both low offset 32 and high offset 46, both comparators 28 and 44 are triggered. The fast clock FC is therefore coupled into the clock input CC in digital up/down counter circuit 14 through gates 50, 52 and 36, causing the iris opening to shift at a rapid rate. When the iris 20 has adjusted sufficiently to bring the video outputs within the range presented by comparator 44, the third command signal drops out, thus disabling the fast clock FC at gate 50. Since, however, the video outputs are still outside the range presented by comparator 28, the digital up/down counter 14 continues counting at a rate fixed by the slow clock SC until the correction is completed.

From the foregoing it will be apparent that the two-loop control system described provides rapid response to abrupt shifts of the video output level, while preventing overshoot by slowing the response speed of the control network as the video output approaches the nominal level. Furthermore, the digital nature of the circuitry ensures accurate and error free correction of video output intensity.

Figure 3:
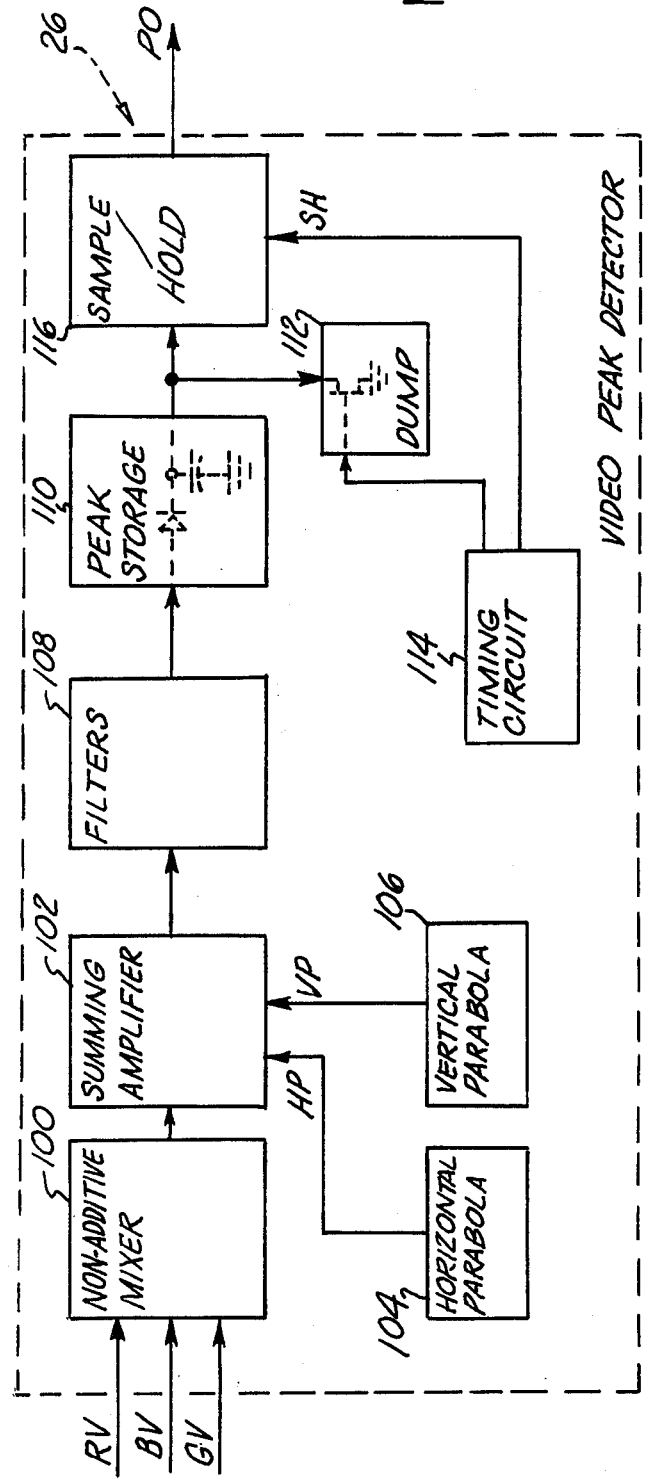
FIG. 3 is a block diagram of a preferred embodiment of the video peak detector to be utilized herewith.

Referring now to FIG. 3 video peak detector 26 has a nonadditive mixer 110 to which video signals RV, BV, and GV are directed. Mixer 100 combines the video signals such that the output responds at each moment to whichever of the video signals is greater at that moment. Summing amplifier 102 additively combines the output of mixer 100 with center picture emphasis signals provided by horizontal parabola circuit 104 and vertical parabola circuit 106. Parabola circuits 104 and 106 are waveform generators having periodic output signals. The purpose of parabola circuits 104 and 106 and summing amplifier 102 is to selectively emphasize the signals of greatest interest, i.e. those signals representing the center of the subsequently displayed image. This is accomplished by adding the video signal to synchronous signals having small amplitudes for video signals corresponding to the periphery of the picture and larger amplitudes for video signals corresponding to the center of the picture.

Figure 4:
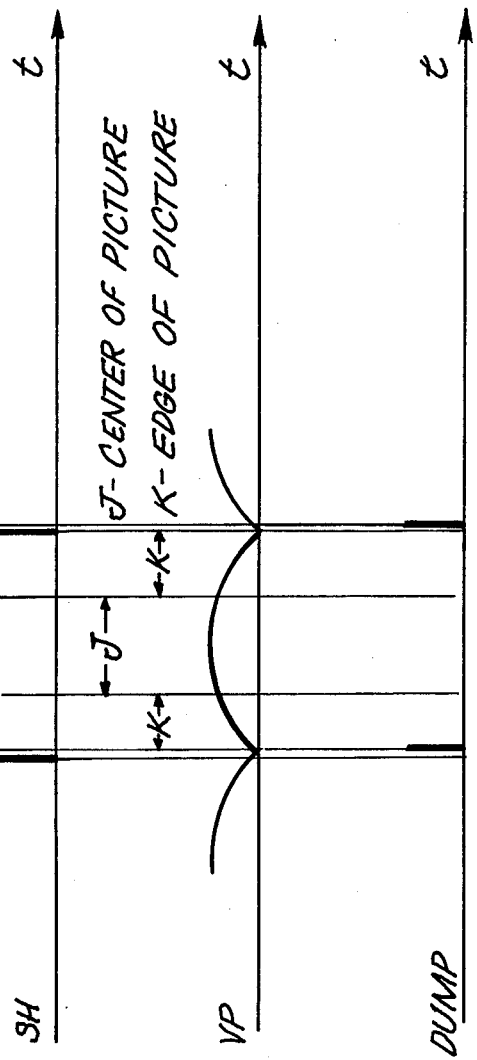
FIG. 4 is a graphical representation of the waveforms found in the video peak detector of FIG. 3.

The waveform of the vertical parabola signal VO is graphically represented in FIG. 4. It will be noted that the vertical parabola waveform is the same frequency as, and is synchronized with the vertical scanning frequency of the camera, represented by vertical drive signal VD. The waveform of horizontal parabolic HP is similar in shape to the vertical parabola waveform and is synchronized with the horizontal scanning frequency in phase and frequency.

The output of summing amplifier 102 is connected to a series of filters 108 which serve to remove extraneous noise signals which are not truly representative of the peak intensity of the remainder of the signal. The signal thus filtered and emphasized is directed to peak storage circuit 110. Storage circuit 110 may take a variety of forms and is conveniently illustrated as a peak detector including a capacitor storage element fed by a diode. The output of storage circuit 110 corresponds to the peak amplitude of the signal. Since there is no low impedance discharge path for the capacitor, the amplitude of the output signal maintained by the storage element does not substantially decay with the passage of time. For this reason the storage element must be periodically "dumped" by discharging the storage element. Dump circuit 112 provides this function and may conveniently comprise a field effect transistor connected in parallel across the storage element. The field effect transistor, normally in a high impedance mode, is switched to a low impedance mode once every "field" by timing circuit 114. A field corresponds to the interval between consecutive vertical drive pulses and thus represents one scan of the picture image. When so dumped, the output of peak detector 110 returns to essentially a zero voltage level. To prevent this dumping transient from reaching the range comparator, sample hold circuit 116 is interposed prior thereto, to sample the output of storage circuit 110 immediately prior to dumping. Timing circuit 114 also provides the signal SH which triggers the sample hold circuit. The relative timing of the dump pulse D and sample hold pulse SH are diagrammatically represented in FIG. 4. With the peak output PO of video peak detector 26 taken from sample hold circuit 112, the signal presented to range comparator 28 bears a close relation to the peak intensity of the immediately proceeding field.

Figure 5:
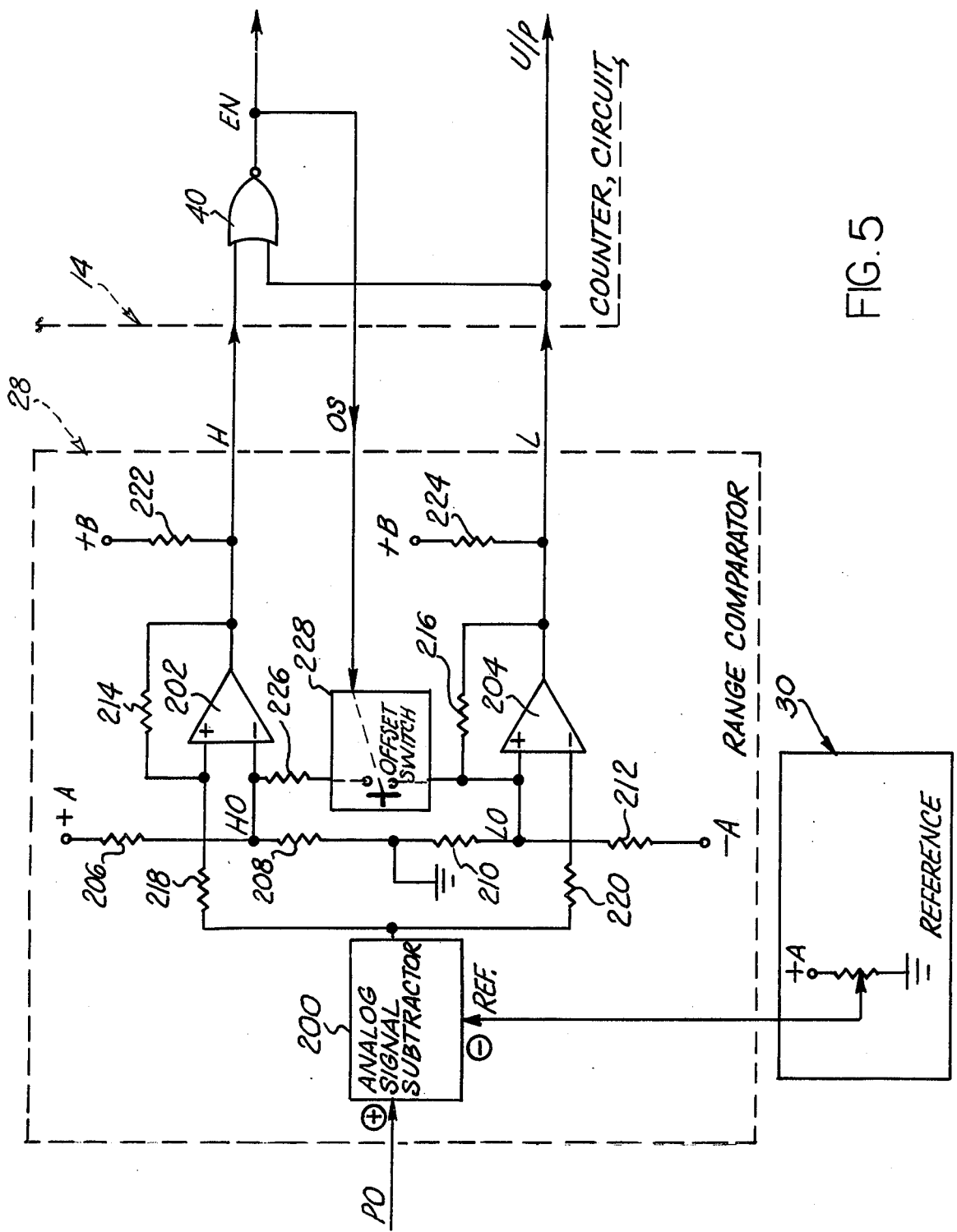
FIG. 5 is a schematic diagram of a preferred embodiment of the range comparator to be utilized herewith.

Referring now to FIG. 5, range comparator 28 receives the peak output signal PO of peak detector 26. Peak signal PO is first D.C. level shifted by analog signal subtractor 200 which subtracts a D.C. signal representing a nominal video signal from the peak signal PO. An adjustable nominal signal can be easily generated as by connecting a potentiometer across an A+ voltage supply and sensing the signal on the wiper arm thereof. The output of signal subtractor 200 thus represents an excursion signal, the amplitude of which is directly related to the excursion of the peak signal from the reference or nominal signal.

To test whether the excursion is within the acceptable range, the excursion signal is directed to the positive input of upper limit comparator 202 and the negative input of lower limit comparator 204. Upper limit comparator 202 compares this signal with a positive offset signal to produce command signal H. This offset signal HO is developed at the junction of resistors 206 and 208, which are series connected between a fixed positive voltage A+ and ground potential. Similarly, lower limit comparator 204 compares the excursion signal with a negative offset signal to produce command signal L. This negative offset signal LO is developed at the junction of resistors 210 and 212, which are series connected between ground potential and a fixed negative voltage A−. Resistors 218 and 220 are respectively interposed between level shifter 200 and comparators 202 and 204. Positive feedback resistors 214 and 216, respectively, shunt comparators 202 and 204. These resistors insure positive switching of the comparators by introducing a small amount of hysterisis in the transfer characteristics thereof. Pull-up resistor 222, connecting the output of comparator 202 to a B+ voltage supply, is included to insure that when the comparator switches to a positive output state, the output line will rise above the level designated as a digital 1. For similar reasons, pull up resistor 224 connects to output of comparator 204 to a B+ supply voltage.

Resistor 226 and offset switch 228 are included to lower the offset limits when the excursion signal passes beyond the normal offset limits. Were not this feature included, the correction process would cease immediately upon the signal reaching the limit of the acceptable range. The peak signal would thus tend to hover about the offset limits. By narrowing the offset limits, the correction will continue until the peak video signal is more deeply within the acceptable range.

This function is provided by shunting current between the offsets whenever either command signal is high. This drops the voltage of the offsets, thus narrowing the acceptable signal range. The output EN of NOR gate 38 of counter 6 is used to monitor the state of the command signals. As long as output EN is high, the offset switch is in a high impedance state, and little or no shunting of current occurs. When EN goes low, the offset switch actuates, switching to a low impedance state and shorting the high and low offset inputs HO and L) through resistor 226. A field effect transistor is preferable for this function because of its low "on" impedance and high "off" impedance.

Although the invention has been described in conjunction with a preferred embodiment, it is to be appreciated that various modifications and arrangements of parts may be without departing from the spirit and scope of the invention as defined by the appended claims.

Having thus described my invention, I claim:

1. Automatic digital aperture control apparatus for a television camera having at least one video output signal and comprising;
   peak detection means responsive to said at least one video output signal for providing a peak signal having a value which varies with the intensity of said video output signal;
   count control means for producing a first command signal when said peak signal rises above a first upper limit, and a second command signal when said peak signal falls below a first lower limit;
   a source of first clock pulses having a first pulse repetition rate;
   bidirectional digital counting means for counting clock pulses in a first or second direction in response to said first and second command signals, said counting means providing a digital output signal having a value in dependence upon the pulse count difference between the number of clock pulses counted in said first direction and those counted in said second direction;
   digital to analog converting means for converting said digital output signal to a corresponding analog signal having a value in accordance with said pulse count difference;
   aperture control means for controlling the amount of light admitted to said television camera in response to said analog signal;
   a source of second clock pulse having a second pulse repetition rate greater than said first pulse repetition rate;
   gating means responsive to a third command signal for gating said second clock pulses to said counting means and for otherwise gating said first clock pulses to said counting means; and,
   means for providing said third command signal when said peak signal rises above a second upper limit greater than said first upper limit or falls below a second lower limit smaller than said first lower limit.

2. Automatic light level control apparatus as set forth in claim 1 wherein said count control means includes means for narrowing the range between said first upper limit and said first lower limit whenever either of said first or second command signals is produced.

3. Automatic light level control apparatus for a television camera having an operative lens cap, said control apparatus comprised as set forth in claim 1 and further comprising means for disabling said counting means when said lens cap is in operation.

4. Automatic light level control apparatus as set forth in claim 1 wherein said count control means comprises:
   level shift means for lowering the D.C. amplitude of said peak signal by an fixed amount equal to a nominal signal level to produce an excursion signal;
   first comparator means for providing said first command signal when said excursion signal rises above a positive offset level; and
   second comparator means for providing said second command signal when said excursion signal drops below a negative offset level.

5. Automatic light level control apparatus as set forth in claim 4 and further comprising offset level switch means responsive to both of said first and second command signals for narrowing the difference between said positive and negative offset levels whenever either of said first or second command signals is produced.

6. Automatic light level control apparatus for use in a television camera having at least one video output signal and comprising:
   means responsive to said video signal for determining whether said video signal is within a first range of acceptable amplitudes and for providing an indication signal when said video signal has passed beyond said range; and,
   light level control means responsive to said indication signal for adjusting the amount of light admitted to said television camera until video signal is within a second range which is within, but narrower than, said first range.

* * * * *